(12) United States Patent
    Loeffler

(10) Patent No.: US 12,597,837 B2
(45) Date of Patent: Apr. 7, 2026

---

(54) SYSTEM AND METHOD FOR STARTING HIGH INERTIA MACHINES

(71) Applicant: RENK GmbH, Augsburg (DE)

(72) Inventor: Dan Loeffler, Augsburg (DE)

(73) Assignee: RENK GmbH (DE)

( * ) Notice: Subject to any disclaimer, the term of this patent is extended or adjusted under 35 U.S.C. 154(b) by 298 days.

(21) Appl. No.: 18/346,450

(22) Filed: Jul. 3, 2023

(65) Prior Publication Data

US 2025/0015692 A1     Jan. 9, 2025

(30) Foreign Application Priority Data

Jul. 4, 2022    (DE) ..................... 10 2022 206 807.6

(51) Int. Cl.
    H02K 17/34      (2006.01)
    H02K 7/10       (2006.01)
    H02K 7/118      (2006.01)

(52) U.S. Cl.
    CPC .............. H02K 17/34 (2013.01); H02K 7/10 (2013.01); H02K 7/118 (2013.01)

(58) Field of Classification Search
    CPC .......... H02K 17/34; H02K 7/10; H02K 7/118; H02P 5/747; H02P 1/02; H02P 1/04; F02N 11/0859; F02N 11/006; F02N 2200/022
    See application file for complete search history.

(56) References Cited

U.S. PATENT DOCUMENTS

| | | | | | |
|---|---|---|---|---|---|
| 1,535,774 | A | * | 4/1925 | Hibbard | .................. H02K 19/12 318/716 |
| 3,293,898 | A | * | 12/1966 | Thomas | .................. B21B 35/12 72/249 |

| | | | | | |
|---|---|---|---|---|---|
| 4,366,887 | A | * | 1/1983 | Hofbauer | ................ F16D 21/08 192/85.5 |
| 6,242,884 | B1 | * | 6/2001 | Lipo | ........................ H02P 21/36 318/524 |
| 2012/0082570 | A1 | * | 4/2012 | Schultz | ............... F16H 61/0028 417/212 |

FOREIGN PATENT DOCUMENTS

| | | | |
|---|---|---|---|
| DE | 3640146 | A1 | 6/1988 |
| DE | 102017104461 | A1 | 9/2018 |
| DE | 102020103113 | A1 | 8/2021 |
| JP | H07203695 | A * | 8/1995 |

OTHER PUBLICATIONS

JP-H07203695-A_translate (Year: 1995).*
Gernman Patent Office; Examination Report in related German Patent Application No. 10 2022 206 807.6 dated Mar. 30, 2023; 7 pages.

* cited by examiner

*Primary Examiner* — Ahmed Elnakib
*Assistant Examiner* — Mohammed Ahmed Qureshi
(74) *Attorney, Agent, or Firm* — Dorton & Willis, LLP

(57)         ABSTRACT

A drive system for a working machine with a working device which can be unloaded for starting, wherein the drive system comprises at least one main motor, which is designed as an electric machine, in particular as an asynchronous motor, and a motor shaft; an auxiliary motor, which is designed as an electric machine, in particular as an asynchronous motor; and a starting device for starting the auxiliary motor. The auxiliary motor is configured to start and/or accelerate the working machine, in particular up to a synchronous speed of the main motor.

20 Claims, 2 Drawing Sheets

SYSTEM AND METHOD FOR STARTING HIGH INERTIA MACHINES

CROSS-REFERENCE TO RELATED APPLICATIONS

This application claims the benefit of priority under 35 U.S.C. § 119 (a) to German Patent Application 10 2022 206 807.6, filed Jul. 4, 2022 (pending), the disclosure of which is incorporated by reference in its entirety.

TECHNICAL FIELD

The present invention relates to a drive system for working machines, and to a method for starting and/or operating a working machine.

BACKGROUND

Starting large electric motors on the mains is a technically challenging issue, for example in cement plants or the like. Drive motors of vertical roller mills, for example, are also affected. This can be due to various reasons.

Grid stability is usually not permanently guaranteed for cement plants in emerging countries, for example. These grids are usually characterized by long line lengths, low short-circuit power, in some cases isolated grids with diesel generators and, in particular, poor grid quality. Directly connecting and starting up electric motors on the grid, for example, would cause too great a voltage drop.

For this reason, slip-ring induction motors with liquid starters continue to be the main type of motor used in the cement industry. The rotors of these motor types are connected via sliding contacts to cathodes in a salt bath solution. By moving the cathodes in and out, the rotor resistance is changed and the electrical characteristic of the motor is shifted. However, these are fraught with problems.

SUMMARY

The object of the present invention is to improve a drive system for a working machine and a method for operating, in particular starting, a working machine.

This task is solved by a drive, and a method for operating the working machine as described herein.

Embodiments or advantages of embodiments are described herein (in part) using the example of a mill, in particular a vertical roller mill, an extruder or a crusher. This is to be understood without limitation of generality. In particular, in a particularly advantageous application, in particular embodiment, a working machine is: a mill, in particular a vertical roller mill, a crusher, a fan or a pump, without the invention being limited in any way thereto.

According to one embodiment of the present invention, a drive system is provided for a working machine having a working device which can be relieved/unloaded for starting, in particular which is relieved during starting. In one embodiment, the drive system has at least one main motor which is designed as an electric machine. Further, in one embodiment, the at least one main motor comprises a motor shaft. In one embodiment, the drive system further comprises an auxiliary motor configured as an electric machine. In one embodiment, the drive system comprises a starting device for starting the auxiliary motor. In one embodiment, the auxiliary motor is arranged to start and/or accelerate the working machine, in particular up to a synchronous speed of the main motor or up to at least substantially a synchronous speed of the main motor.

The term "relievable" or "unloadable" as used herein shall preferably be understood as, in particular, a reduction, in particular of a counter-torque, to at least 60 percent, at least 50 percent, at least 40 percent, at least 30 percent and/or a reduction to at most 5 percent of a nominal torque or load of the working device, which is made or can be made by means for relieving in the working device of the working machine. In one embodiment, in particular when the working machine is a mill, a crusher or an extruder, "relievable", as used herein, is to be understood as driving empty/unloading of the working device, in particular by means for relieving/unloading the working device, in particular by an existing or another, in particular additional, auxiliary drive or auxiliary motor.

In one embodiment, in particular in emerging countries or in countries with frequency fluctuations in the power grid or unstable grid frequency, this can advantageously prevent a collapse of the, in particular local, power grid, and in particular reduce current peaks and/or torque peaks.

In one embodiment, the main motor is an asynchronous motor, in particular one switched by a medium-voltage circuit breaker, or a synchronous motor. In one embodiment, the auxiliary motor is a DC motor, an asynchronous motor, a reluctance motor, an externally excited synchronous motor or a permanent magnet excited synchronous motor. In one embodiment, the drive system comprises one, in particular at least one, of the possible combinations of the aforementioned designs of the main motor and the auxiliary motor.

In one embodiment, a starting device is a frequency converter, in particular a low-voltage frequency converter. In one embodiment, the starting device is a soft starter, in particular a star-delta circuit, an electronic soft starter, or a Direct On-Line Motor (DOL). A working machine is in one embodiment a mill, in particular a vertical roller mill, a crusher, an extruder, a fan, a pump or the like, in particular with a high (starting) moment of inertia, further in particular (in each case) with means for unloading the working device.

Taking the example of a mill, in particular a vertical roller mill, in one embodiment a relievable or relieved working device corresponds to a relievable or relieved grinding device, in particular at least one liftable roller or (at least) one roller lifted from the grinding bed. In one embodiment, the mill comprises means for relieving/unloading the grinding device, in particular for lifting the at least one roller from the grinding bed. Taking the example of a crusher, in particular a jaw crusher, in one embodiment a relievable or relieved working device corresponds to a relieved/unloaded crushing unit, in particular an opened jaw and/or a widened or expanded crushing chamber, in particular the crusher in one embodiment comprises means for relieving the crushing chamber. Hereby, in one embodiment, it can be made possible that by means of the drive system a (high) moment of inertia during start-up can be (more) easily overcome, in particular a moment of inertia, in particular if the working machine is a vertical roller mill or an extruder, of (at least substantially) at least 100, at least 200, at least 300, at least 400, or at least 500, and/or at most 2000 kg-m$^2$.

In one embodiment, the working machine is operated or is operable at low speeds, in particular at speeds of (at least substantially) at least 0, in particular more than 0, and/or at most 1000 revolutions per minute (rpm), in particular at high load torques, in particular load torques as described herein. In particular, these indications of revolutions in one embodiment refer to the output speed of the working machine or to a speed downstream of a gearbox, in particular of the main motor.

In one embodiment, a drive system according to an embodiment described herein advantageously does not increase a complexity of the drive system or, in one embodiment, may in particular even reduce a complexity of the drive system. In one embodiment, a drive system is advantageously less complex than, for example, a drive system having a slip ring motor, in particular than a drive system having a slip ring motor with a brush lift-off and rotor shorting device. In one embodiment, this may allow the drive system to be at least substantially maintenance free (er). Further, in one embodiment, this may enable the drive system to be offered or produced at a lower cost. In one embodiment, the starting behavior of the drive system is at least substantially always the same, in particular independent of an ambient temperature, a salt bath concentration and/or a cathode wear. In one embodiment, this can advantageously achieve a lower load, in particular during starting, on the transmission and/or the working machine, in particular due to lower or reduced torque surges and/or alternating torques. Furthermore, in one embodiment it can be made possible that the starting behavior of the drive system is advantageously improved, in particular in comparison with systems that use an autotransformer, a soft starter or the like.

In one embodiment, this can advantageously enable a starting time of the drive system to be extended, in particular longer than in a drive system with a liquid starter as starting device. Through this, in one embodiment, high/higher motor speeds can be implemented, in particular higher motor speeds than the usually used 1000 rpm, further in particular a heating up of the auxiliary motor can be reduced, in particular in comparison with a liquid starter as auxiliary motor, further in particular this heating is not problematic and/or limiting for the motor speed when starting up the auxiliary motor. In one embodiment, this can be made possible in particular by starting the auxiliary motor described herein with a device, in particular a frequency converter, and at least substantially hardly loading or only slightly loading the grid. In a further embodiment, this can make it possible for comparatively simple, in particular less complex, motors to be used as main or auxiliary motors, in particular motors with a low (er) number of pole pairs, in particular with a number of pole pairs of at least 1, 2 or 3 and/or a number of pole pairs of at most 10. For this further embodiment, in one embodiment the working machine has a gearbox which is designed for a transmission ratio corresponding to the higher number of revolutions, in particular in one embodiment the working machine then has bearings which are designed for correspondingly higher peripheral speeds. By this, in particular by a higher nominal speed, an auxiliary motor and/or main motor is advantageously small (er), light (er), cheap (er) and/or has in particular a better efficiency or power factor.

In one embodiment, the auxiliary motor has at least $\frac{1}{10}$ of the power of the main motor and/or at most $\frac{1}{5}$ of the power of the main motor. In one embodiment, the auxiliary motor has at most $\frac{1}{6}$, $\frac{1}{7}$, $\frac{1}{8}$, $\frac{1}{9}$ or $\frac{1}{10}$ and/or at least $\frac{1}{20}$, $\frac{1}{15}$ or $\frac{1}{10}$ of the power of the main motor.

In one embodiment, this can enable the auxiliary motor, in particular the drive system, to be more cost-effective than, for example, a liquid starter, in particular a slip ring motor with a liquid starter. Further, in one embodiment, the complexity of the drive system can be reduced, in particular lighter (er) and/or smaller (er) motors can be used than, for example, in the aforementioned slip ring motor. In one embodiment, this can increase a maintenance interval, in particular because motor brushes and/or salt bath solutions do not need to be changed. Further, in one embodiment, a thermal load on the components can be reduced, in particular the stator, rotor and salt bath (which is not present or required in the drive system described herein). Advantageously, in one embodiment, this can enable more starting processes to be carried out, in particular because of (significantly) reduced cooling times, for example compared to slip ring motors with liquid starters, in particular because of cooling times in the range of minutes, in particular 10 min or less, even over several starting processes, in particular more than 3 starting processes. Advantageously, in one embodiment, a cooling time can be dispensed with, in particular cooling can be omitted. In one embodiment, this can reduce dependence on the quality of the power grid or other grid dependencies such as, in particular, externally introduced voltage dips, asymmetries and/or long cable paths.

In one embodiment, the auxiliary motor may have a power of at least 200 KW and/or at most 400 KW, in particular when the main motor has a power of at least 2 MW and/or at most 4 MW. In one embodiment, the main motor is configured to have a power of at least 2 MW, at least 6 MW and/or at most 7 MW, at most 8 MW, at most 9 MW, in particular when the working machine is a mill, at most 20 MW, at most 25 MW, at most 30 MW, in particular when the working machine is an extruder. In one embodiment, an auxiliary motor is configured to have a power correspondingly adapted to the power of the main motor, in particular as described herein.

In one embodiment, the auxiliary motor has a pole pair number of at least 2 and/or at most 10. In one embodiment, the auxiliary motor can, in particular at a nominal speed described herein, in particular at a nominal torque of at least 1500 Nm and/or at most 10000 Nm, apply a breakdown torque of at least 3000 Nm and/or at most 20000 Nm for a short time, in particular for at least 5 seconds, in particular when the auxiliary motor is operated on a starting device designed as a frequency converter, further in particular at a power described herein.

In one embodiment, the main motor is a squirrel-cage induction motor, a doubly-fed induction motor, or a separately excited or permanently excited synchronous motor. In one embodiment, the main motor is preferably a squirrel-cage rotor. Hereby, in one embodiment, the drive system can be manufactured at low (er) cost, in particular low (er) complexity. In one embodiment, the number of (separate) auxiliary drives (maintenance, start-up, etc.) can be reduced.

In one embodiment, the auxiliary motor is arranged at a second shaft end or between the main motor and the working machine or a subsequent gearbox. In one embodiment, an output takes place at a first shaft end of the motor shaft of the main motor, in particular to a gearbox, in particular of a working machine, further in particular to a gearbox of a mill, in particular vertical roller mill, of a crusher, of an extruder, of a fan or of a pump. In one, in particular alternative or supplementary, embodiment, the auxiliary motor is connected to the motor shaft of the main motor via a mechanical or a hydraulic torque converter and/or via a mechanical or hydraulic speed converter, in particular with an (auxiliary) gearbox. In one embodiment, the auxiliary motor is connected to the motor shaft of the main motor via a belt connection or a chain connection. In one embodiment, the connection of the auxiliary motor to the motor shaft of the main motor may have a transmission ratio that is not 1:1, in particular greater than 1:1 or less than 1:1.

In one embodiment, the auxiliary motor is designed for maintenance operation, in particular in such a way that the auxiliary motor can be or is operated at a speed in which maintenance of the drive system, in particular of the working machine, further in particular of a mill, in particular of a vertical roller mill, can be, in particular is, carried out. This can make it possible that in one embodiment a welding on in the working machine, in particular a mill, in particular in the working device of the working machine, in particular a grinding bed of a mill, can be or is carried out with the auxiliary motor.

Advantageously, this means that in one embodiment there is no need for an (additional) maintenance motor, in particular this maintenance motor can be dispensed with. In particular, in one embodiment the drive system does not have an (additional) maintenance motor.

In one embodiment, the auxiliary motor is operatively connected to the main motor by means of a switchable clutch or an overrunning clutch. In one embodiment, the switchable clutch establishes an operative connection between the auxiliary motor and the second shaft end of the main motor. In one embodiment, the overrunning clutch disengages one direction of rotation and establishes an operative connection between the auxiliary motor and the second shaft end of the main motor in the other direction of rotation. In one embodiment, this allows the auxiliary motor to be decoupled from the main motor, in particular when the main motor or the working machine has reached its set speed.

In one embodiment, the starting device is designed as a frequency converter. Advantageously, the auxiliary motor can be operated because of its, in particular frequency converter, drive in one embodiment when used in combination with a main motor, in particular several main motors, in particular main motor(s) designed as doubly fed asynchronous motor(s).

In one embodiment, the auxiliary motor can advantageously continue to be operated depending on the required drive power at the starting device, in particular at the frequency converter, in particular during operation of the working machine, in particular permanently during operation of the main motor, or can be switched off to save energy.

In one embodiment, the drive system has a frequency converter, in particular, in one embodiment, the starting device of the drive system is designed as a frequency converter, further in particular, in one embodiment, the frequency converter is configured to enable a soft start, in particular, configured in such a way that additionally, in particular, a speed of the auxiliary motor can be (steplessly) changed, in particular, can be adjusted. Hereby, in one embodiment, essentially the same advantages (possibly with the exception of a maintenance operation) as already described above can be achieved.

In one embodiment, the drive system comprises a soft start, in particular the starting device is configured as a soft start in one embodiment. In one further embodiment, the soft start is designed in particular as a star-delta circuit or as a soft starter with which the auxiliary motor is or can be started.

In one embodiment, the auxiliary motor, in particular the rotor and/or stator windings of the auxiliary motor, is integrated into the housing of the main motor. Advantageously, a compact installation space can be achieved or implemented in one embodiment.

In one embodiment, the auxiliary motor is configured to adapt a speed in such a way that a synchronous speed valid for a mains frequency measured in the supply network is present when the main motor is switched on. In one embodiment, this makes it possible to react dynamically to the conditions of a power grid, in particular an unstable power grid, and in particular to prevent the start-up of the working machine from causing a voltage drop, in particular a large voltage drop, in the power grid, in particular due to a high inrush current at non-synchronous speed when switching on.

In one embodiment, the main motor of the drive system comprises at least two independent winding systems, in particular two winding systems, each of which can be or is (switchably) connected to the power grid independently of one another. In one embodiment, this can make it possible that, in the event of failure of one winding system, at least substantially more than 30 percent, more than 40 percent or more than 50 percent of the total drive power of the drive system is available, in particular together with the power of the auxiliary motor. In one embodiment, this can enable a working machine, in particular a mill, further in particular a vertical roller mill, a crusher, a fan and/or a pump, to still be operable, in particular to be operated. In one embodiment, a switchgear for switching the drive system accordingly comprises a further motor output. In one embodiment, the switchgear is comprised by the drive system.

In one embodiment, the drive system comprises at least two main motors, these being configured, in particular, in such a way that a total power of the at least two main motors corresponds (at least essentially) to a power of a single main motor with which a working machine is operable or can be operated. In a further embodiment, the at least two main motors are coupled in series, in particular in a tandem arrangement, or are coupled to the drive of the working machine via a collective transmission, in particular a summation transmission, in particular in parallel. In one embodiment, each of the at least two main motors comprises an auxiliary motor coupled to the respective motor shaft. In an embodiment with a tandem arrangement, the tandem arrangement of the at least two main motors comprises, in a further embodiment, one, in particular exactly one, auxiliary motor.

In one embodiment, the working device is unloadable, in particular designed in such a way that the working device is unloaded for starting the drive system. In one embodiment using the example of a mill, the at least one roller of the mill, in particular of the vertical roller mill, is liftable off of a grinding bed, in particular lifted off. In this way, in one embodiment, a low (er) loosening torque can be achieved.

In one embodiment, the working machine has a slowly rising load characteristic during ramp-up. In one embodiment, this can advantageously enable the system to have sufficient reserves for acceleration, in particular without having to over-dimension the auxiliary motor, especially in comparison with the main motor, preferably with a power that is less than $\frac{1}{5}$ of the power of the main motor.

Usually, "pony motors" are known in the prior art and are used for individual tasks in the system with usually long service lives. In one embodiment, the auxiliary motor is used for starting, rotating and maintenance tasks of the working machine or is set up for this purpose, in particular in mills, fans, pumps or crushers, further in particular in vertical roller mills. In this way, in one embodiment, additional or separate motors can be dispensed with for the respective tasks.

According to one embodiment of the present invention, a method of operating a working machine, in particular a mill, fan, pump or crusher, in particular a vertical roller mill, is provided. In one embodiment, the working machine is provided with or comprises a drive system described herein. In one embodiment, the method comprises unloading the working device, in particular (by way of example) in the case of a mill, lifting the at least one roller from the grinding bed, in particular lifting all rollers present in the mill, or (by way of example) in the case of a crusher, unloading a crushing jaw or the like. Further, in one embodiment, the method comprises starting the drive system, wherein in particular the auxiliary motor controlled by the starting device, further in particular the frequency converter controlled auxiliary motor, is used to start the drive system, in particular one/the main motor of the drive system, at least one main motor of the drive system or all main motors of the drive system. In one embodiment, the method further comprises connecting/switching on the main motor, in particular at a synchronous speed.

In one embodiment, the method may further comprise, in particular in a first step, measuring a mains frequency. In a further embodiment, the method may further comprise, in particular in a further step, the adjustment of the rotational speed, in particular a dynamic adjustment of the rotational speed, so that, in particular when the main motor is switched on, the synchronous rotational speed that is currently valid, preferably at this time, in particular at the time of switching on the main motor, is present.

In one embodiment, the method may comprise, in particular during operation of the working machine, determining a load on the main motor, in particular by determining a main motor current, a main motor winding temperature or a drive torque. In a further embodiment, the method may comprise, in particular in a further step, load-dependent starting of the auxiliary motor, in particular for assisting the main motor, so that the drive system can or does apply/provide the required drive power. In one embodiment, the method comprises a connecting of the auxiliary motor, in particular starting of the auxiliary motor or switching on of the auxiliary motor, in particular operated in parallel with the main motor, in particular operated decoupled from the main motor, based on the determination of a load on the main motor, in particular for supporting the main motor. In this way, in one embodiment, a main motor can advantageously be relieved of load, in particular during load peaks or permanently.

In one embodiment, this can advantageously prevent an overload of the main motor with the load-dependent start of the auxiliary motor. In one embodiment, a load-dependent stop of the auxiliary motor can advantageously improve an efficiency of the overall drive.

In one embodiment, the method may comprise that the auxiliary motor switches to overload operation in a time period with a duration of more than 0.1 second and/or less than 2 seconds or switches to operation without load transfer in a time period with a duration of less than 2 seconds, in particular acts on the main motor while the main motor is operated at a set speed, in particular based on a determination of the load on the main motor. In one embodiment, this can enable the auxiliary motor to have a corrective effect on, in particular process-induced, vibrations, in particular to prevent and/or reduce them. In a further embodiment, this can reduce or reduces, in particular interrupts, a buildup of vibrations, in particular in the working machine.

According to one embodiment of the present invention, a system is set up, in particular in terms of hardware and/or software, in particular in terms of programming, for carrying out a method described herein.

In one embodiment, the drive system, in particular the working machine, comprises means for unloading the working device, in particular, if the working machine is a mill, in particular a vertical roller mill, means for lifting off the at least one roller.

According to one embodiment of the present invention, a or the system comprises:

Means for starting the drive system, in particular by means of the auxiliary motor controlled by the starting device; and means for engaging the main motor at synchronous speed.

In one embodiment, the system or its means comprises: Means for measuring a mains frequency, in particular a (data) interface for receiving or querying a value for the mains frequency, means for adapting a rotational speed, in particular for dynamically adapting a rotational speed, so that when the main motor is switched on, at least substantially the currently valid synchronous rotational speed is present.

A system and/or a means in the sense of the present invention can be configured in terms of hardware and/or software, in particular comprise at least one, in particular digital, processing unit, in particular microprocessor unit (CPU), graphics card (GPU) or the like, preferably connected to a memory and/or bus system in terms of data or signals, and/or comprise one or more programs or program modules. The processing unit may be designed to process instructions implemented as a program stored in a memory system, to acquire input signals from a (data) interface or a data bus, and/or to output signals to a data bus. A memory system may comprise one or more, in particular different, storage media, in particular optical, magnetic, solid-state and/or other non-volatile media. The program may be such that it embodies or is capable of executing the procedures described herein, such that the processing unit can execute the steps of such procedures and thereby operate or monitor the mill in particular.

In one embodiment, a computer program product may comprise, in particular be, a storage medium, in particular computer-readable and/or non-volatile, for storing a program or instructions or having a program or instructions stored thereon. In one embodiment, execution of said program or instructions by a system or controller, in particular a computer or an arrangement of multiple computers, causes the system or controller, in particular the computer or computers, to execute a method described herein or one or more of its steps, or the program or instructions are arranged to do so.

In one embodiment, one or more, in particular all, steps of the process are performed in a fully or partially automated manner, in particular by the controller or its means.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
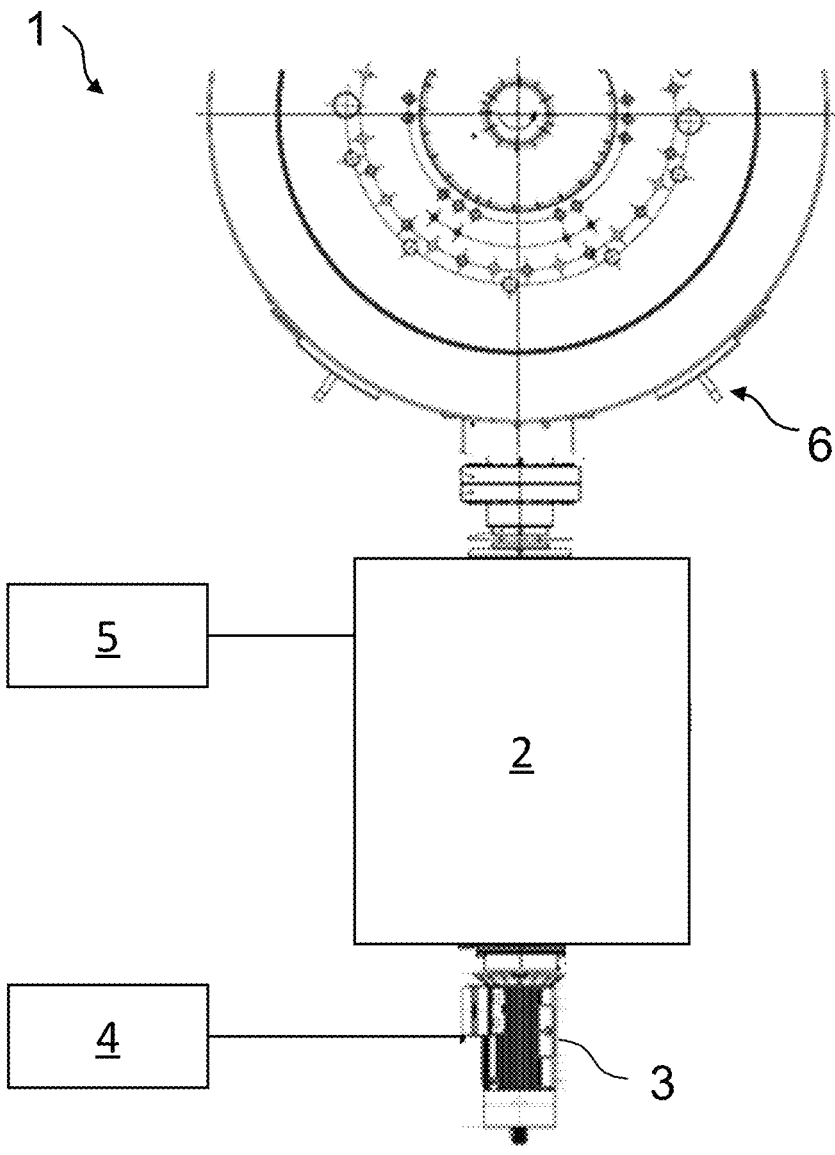
FIG. 1 schematically illustrates a drive system according to one embodiment of the present invention.

FIG. 1 schematically shows a drive system 1 as described in embodiments herein. The drive system 1 comprises a main motor 2 which can be or is switched via a medium voltage circuit breaker 5. Further shown is an auxiliary motor 3 disposed on a second end of the shaft of the main motor 2. The auxiliary motor 3 shown is controlled or operated by a frequency converter 4 in a variable speed manner. The first end of the shaft is coupled here to a gearbox 6 of a mill, or is operatively connected to it.

Figure 2:
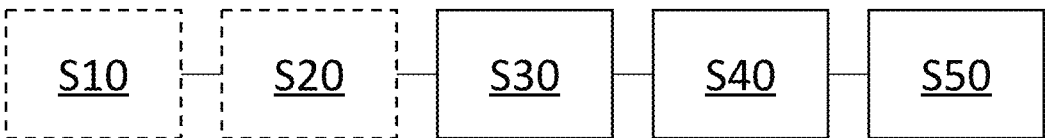
FIG. 2 illustrates a method according to one embodiment of the present invention.

FIG. 2 schematically shows a procedure with the steps S10 to S50. In a step S10, a mains frequency can be measured, preferably optionally (shown by the dashed line). According to the measured mains frequency, in a further, in particular optional step S20 (also represented by dashing), a (set) speed can be adjusted, preferably dynamically, in such a way that when the main motor S50 is switched on, the currently valid synchronous speed is (at least essentially) present. In a further step S30, the at least one working device of the working machine, preferably all working devices of the working machine, is unloaded. In a step S40, after unloading the working device of the working machine, preferably all working devices, the drive system, preferably the auxiliary motor, is started by means of the starting device 4. The main motor is switched on in a step S50 when at least substantially a synchronous speed is reached.

Figure 3:
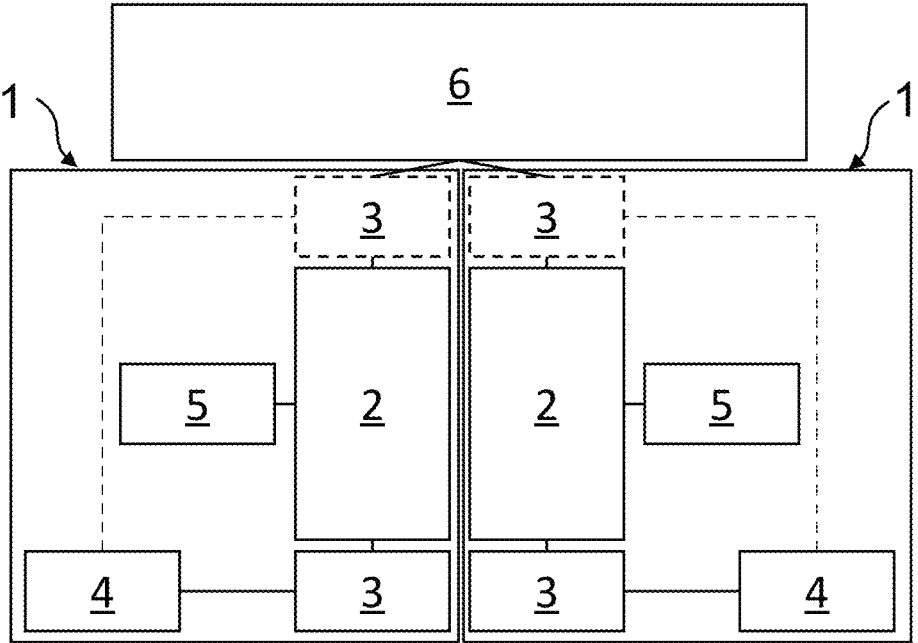
FIG. 3 schematically depicts a drive system according to one embodiment of the present invention.

FIG. 3 schematically shows a drive system 1 as described in embodiments herein. The drive system 1 has several, here preferably two, main motors 2, which can preferably be switched via a medium-voltage circuit breaker 5. Furthermore, an auxiliary motor 3 is shown in each case, which is arranged at a second end of the shaft of the main motor 1. In dashed lines, an auxiliary motor is shown in each case in an alternative arrangement at the first shaft end of the shaft of the main motors 1. The auxiliary motors 3 shown are controlled or operated with variable speed by a starting device 4. The first shaft end of the main motors 2 is in each case schematically coupled to a gear unit 6 of a mill, or operatively connected thereto, for example via a summation gear unit (not shown).

Although exemplary embodiments have been explained in the preceding description, it should be noted that a variety of variations are possible. Furthermore, it should be noted that the exemplary embodiments are merely examples that are not intended to limit the scope of protection, applications or construction in any way. Rather, the foregoing description provides the skilled person with a guide for implementing at least one exemplary embodiment, wherein various modifications, particularly with respect to the function and arrangement of the described components, may be made without departing from the scope of protection as it results from the claims and from these equivalent feature combinations.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

1 Drive system
2 Main engine

3 Auxiliary motor
4 Starting device
5 Medium voltage circuit breaker
6 Gearbox
S10 Measuring a mains frequency
S20 Adjusting the speed
S30 Lifting the roller(s)
S40 Starting the drive system/auxiliary motor
S50 Switching on the main motor.

What is claimed is:

1. A drive system for a working machine with a working device that can be unloaded for starting the machine, the drive system comprising:
   at least one main motor designed as an electric machine, and including a motor shaft;
   an auxiliary motor designed as an electric machine; and
   a starting device for starting the auxiliary motor;
   wherein the auxiliary motor is configured to at least one of start or accelerate the working machine; and
   wherein the auxiliary motor, in cooperation with the starting device, is configured to adjust a rotational speed in such a way that when the main motor is switched on, a valid synchronous rotational speed is present for a mains frequency measured in a supply network that provides power to the drive system.

2. The drive system of claim 1, wherein at least one of:
   at least one of the at least one main motor or the at least one auxiliary motor is configured as an asynchronous motor; or
   the auxiliary motor is configured to at least one of start or accelerate the working machine up to a synchronous speed of the main motor.

3. The drive system of claim 1, wherein at least one of:
   the auxiliary motor has at least $\frac{1}{10}$ of the power of the main motor; or
   the auxiliary motor has at most $\frac{1}{5}$ of the power of the main motor.

4. The drive system of claim 1, wherein the main motor is one of a squirrel-cage rotor, an asynchronous motor, a doubly-fed asynchronous motor, an externally excited synchronous motor, or a permanent-magnet excited synchronous motor.

5. The drive system of claim 1, wherein:
   the motor shaft has a first end and an oppositely disposed second end;
   the first end of the motor shaft configured to provide power output; and
   the auxiliary motor is arranged at the second end of the motor shaft, parallel to the main motor, or between the main motor and a subsequent transmission.

6. The drive system of claim 1, wherein the auxiliary motor is configured for use in a maintenance operation of the working machine.

7. The drive system of claim 1, further comprising:
   a switchable clutch or an overrunning clutch operatively connecting the auxiliary motor to the main motor.

8. The drive system of claim 1, wherein:
   the starting device is configured as a star-delta circuit; and
   the auxiliary motor is started with the star-delta circuit by reducing a starting current of the drive system.

9. The drive system of claim 1, wherein the starting device is designed as a frequency converter.

10. The drive system of claim 1, wherein the main motor comprises at least two independent winding systems, each of which can be connected independently to a power supply system.

11. The drive system of claim 1, wherein:

the at least one main motor is one of:

exactly one main motor, at least two main motors, or no more than 10 main motors; and each main motor is connected independently to a power supply system.

12. A working machine, comprising:

a drive system according to claim 1; and a working device;

wherein the working machine is adapted to unload the at least one working device.

13. The working machine of claim 12, wherein the working machine is configured as a vertical roller mill.

14. A method for operating a working machine, the working machine including at least one working device and a drive system comprising at least one main motor designed as an electric machine and having a motor shaft, an auxiliary motor designed as an electric machine, and a starting device for starting the auxiliary motor, wherein the auxiliary motor is configured to at least one of start or accelerate the working machine, the method comprising:

unloading the at least one working device of the working machine;

starting the drive system with the starter-actuated auxiliary motor; and switching on the main motor at synchronous speed of a supply network.

15. The method of claim 14, wherein the working machine is a vertical roller mill.

16. The method of claim 14, further comprising:

measuring a mains frequency; and adjusting the speed of the working machine with the auxiliary motor so that the currently valid synchronous speed is present when the main motor is switched on.

17. The method of claim 16, wherein the speed is adjusted dynamically.

18. The method of claim 14, further comprising one of:

switching the auxiliary motor to an overload operation in a time period with a duration of less than 2 seconds while the main motor is operated at a setpoint speed;

switching the auxiliary motor to an operation without load takeover in a time period with a duration of less than 2 seconds while the main motor is operated at a setpoint speed; or at least one of starting or operating the auxiliary motor in parallel with the main motor.

19. The method of claim 18, wherein the at least one of starting or operating the auxiliary motor is based on a determined load of the main motor.

20. The method of claim 14, further comprising:

continuing to operate the auxiliary motor with the main motor during operation of the main motor.

\* \* \* \* \*